United States Patent
Hamel et al.

(10) Patent No.: US 10,426,156 B2
(45) Date of Patent: Oct. 1, 2019

(54) METHOD AND APPARATUS FOR DETERRING PEST WITH A LASER BEAM

(71) Applicant: 9943129 Canada Inc., Montreal (CA)

(72) Inventors: Mathieu Hamel, Verdun (CA); Julien Chosson, Montreal (CA)

(73) Assignee: 9943129 CANADA INC., Montreal (CA)

(*) Notice: Subject to any disclaimer, the term of this patent is extended or adjusted under 35 U.S.C. 154(b) by 0 days.

(21) Appl. No.: 16/004,583

(22) Filed: Jun. 11, 2018

(65) Prior Publication Data

US 2018/0352803 A1 Dec. 13, 2018

Related U.S. Application Data

(60) Provisional application No. 62/517,954, filed on Jun. 11, 2017.

(51) Int. Cl.
| | |
|---|---|
| *A01K 3/00* | (2006.01) |
| *A01M 29/10* | (2011.01) |
| *F41H 13/00* | (2006.01) |
| *H01S 3/102* | (2006.01) |
| *A01M 29/08* | (2011.01) |
| *G02B 27/00* | (2006.01) |

(52) U.S. Cl.
CPC ............ *A01M 29/10* (2013.01); *A01M 29/08* (2013.01); *F41H 13/0056* (2013.01); *G02B 27/00* (2013.01); *H01S 3/1026* (2013.01); *A01M 2200/011* (2013.01); *A01M 2200/012* (2013.01)

(58) Field of Classification Search
USPC .................................................. 52/101; 43/1
See application file for complete search history.

(56) References Cited

U.S. PATENT DOCUMENTS

| | | | |
|---|---|---|---|
| 5,343,652 A | 9/1994 | Johnson | |
| 6,625,918 B2 | 9/2003 | Bhullar | |
| 6,718,681 B2 * | 4/2004 | Bhullar | A01M 1/226 340/557 |
| 8,474,411 B2 | 7/2013 | Scott | |
| 8,667,930 B2 | 3/2014 | Hornung | |
| 9,706,765 B2 * | 7/2017 | Lee | A01M 29/10 |
| 2002/0154498 A1 † | 10/2002 | Cramer | |

(Continued)

FOREIGN PATENT DOCUMENTS

| | | | |
|---|---|---|---|
| WO | WO2014185780 A1 | † | 11/2014 |
| WO | WO2015093938 A1 | † | 6/2015 |

*Primary Examiner* — Basil S Katcheves
(74) *Attorney, Agent, or Firm* — BCF LLP (57) ABSTRACT

An apparatus for automatically deterring pest with a light projection on the ground that is perceived as a predator by pests such as birds, which triggers a fear reaction from the birds to leave the area. The apparatus is designed to project a large beam of more than 60 mm diameter in visible light with sufficient power to be seen during daylight. The apparatus is adapted to pan and tilt continuously and randomly within specified limits that are programmed to project the beam in various areas and protect the areas from birds. The apparatus relies on a robotic arm or orientable support mounted on a frame that can be displaced or repositioned easily thanks to a forklift. Methods for activating and controlling the apparatus are also provided.

15 Claims, 9 Drawing Sheets

(56) References Cited

U.S. PATENT DOCUMENTS

| | | | | |
|---|---|---|---|---|
| 2009/0179759 A1* | 7/2009 | Koury | ............... | A01M 29/06 |
| | | | | 340/557 |
| 2011/0144829 A1* | 6/2011 | Kim | ............... | A01M 29/10 |
| | | | | 701/2 |
| 2013/0014692 A1* | 1/2013 | Lee | ............... | A01M 29/10 |
| | | | | 116/22 A |
| 2016/0128315 A1* | 5/2016 | Henskes | ............... | A01M 29/10 |
| | | | | 119/713 |
| 2017/0105403 A1* | 4/2017 | Azzarello | ............... | A01M 1/2005 |

\* cited by examiner
† cited by third party

METHOD AND APPARATUS FOR DETERRING PEST WITH A LASER BEAM

CROSS-REFERENCE TO RELATED APPLICATIONS

The present application claims priority from U.S. Provisional Application No. 62/517,954 filed on Jun. 11, 2017, the entire contents of which are incorporated herein by reference.

FIELD

The present invention generally relates to systems and methods for deterring birds or any other pest. More particularly, the present relates to systems and methods for deterring birds or pests using a laser beam.

BACKGROUND

Laser technology has been used over the last twenty years to deter birds. As presented in U.S. Pat. No. 6,625,918 to Bhullar and U.S. Pat. No. 6,718,681 to Bhullar a laser scanning apparatus is used to deter pest, however its laser produces a narrow beam that is redirected by mirrors and is not wide enough to effectively deter animals or birds.

U.S. Pat. No. 8,474,411 to Scott discloses a hand-held apparatus for producing wide spread laser beam such as a diverging laser beam in order to irritate an animals eye and deter the animal away from the beam.

U.S. Pat. No. 8,667,930 to Hournung discloses a system for averting water fowl settlements. The system uses LED Technology each placed around a buoy and each producing a wide spread beam to deter water fowl. It is possible that such a wide spread may not be visible to birds at a distance of a few meters from the light source in broad day light since such a diverging beam loses intensity over a short distance.

U.S. Pat. No. 5,343,652 to Johnson discloses an apparatus for controlling pests. The apparatus uses a laser beam which is scanned over a defined area and incapacitates sensory organs of various pests when they enter a defined area. The apparatus produces a laser beam of between 2 to 100 watts which relates to Class 4 lasers operating at 500 Mw and higher. Such Class 4 lasers could not only incapacitate animals but can also harm humans and may not be used in an uncontrolled environment. The identified prior art references do not provide a beam that is sufficiently large, coherent and powerful to deter birds in broad daylight and yet safe for the birds, animals and humans.

SUMMARY

The shortcomings of the prior art are generally mitigated by the efficiency of the laser beam created by the laser system. Laser beams pointing toward the ground result in a shape, generally a dot, that is perceived as a flat enlightened surface for the human eye, however it is perceived as a 3D shape by birds. This 3D shape may instinctively be considered as a predator for most birds. Therefore, when a bird sees a laser beam projected next to him, it may fly away if the beam is sufficiently large, coherent and strong.

One aspect of the present technology is a laser system developed to deter birds. A laser and lenses system have been designed to increase the size of the beam to give it a diameter that is larger than 60 mm wide in order to effectively deter most birds. This larger shape may be more visible for birds and may be perceived as a threat that is larger than their size. In addition according to one embodiment, the laser is mounted on a rotatable support that may pan (rotate horizontally) and tilt (rotate vertically) in a continuous manner according to commands provided by a controller. The controller is adapted to control two servo-motors connected to the support according to instructions provided by a processing module such as a CPU. In some embodiments, in order to reduce the risk of failure of this system, most of the electronics may be housed in a sealed container under the orientable support.

According to another aspect of the present technology, the support is mounted on a transportable frame that can be moved by an operator in order to move the laser deterrent system. The frame has two fork receiving members that are designed to accept corresponding forks of a forklift. This way, the frame supporting the laser deterrent system could be easily moved by the forklift.

According to yet another aspect, the laser system is adapted to produce a pattern according to a predetermined algorithm executed by the processing module of the system. According to one embodiment, the processing module is adapted to control the laser system in order to project continuously a laser beam on the ground within the specified area following random patterns or predetermined patterns that may prevent the birds from getting used to the laser beam.

There is provided an apparatus for automatically deterring pest with a light beam comprising: a frame base having a compartment, the compartment comprising: at least one power supply, a processor connected to the at least one power supply, and a memory connected to the processor, an orientable support mounted on the frame base, the orientable support being configured to rotate about a vertical axis and a longitudinal axis, a tower head mounted on the orientable support, the tower head having a housing, the housing comprising: a lighting controller connected to the processor and to the at least one power supply, a lighting source connected to the lighting controller, and a lens system aligned with the lighting source, the lens system having a plurality of lenses, wherein: the lighting source is configured to generate the light beam through the plurality of lenses of the lens system, and the processor is configured to: control the rotation of the orientable support about the vertical axis and the longitudinal axis via execution of instructions stored in the memory for orientating the light beam.

In some embodiments, the light beam is orientated according to at least one of a predetermined pattern and a random point pattern.

In some embodiments, the predetermined pattern is a linear pattern.

In some embodiments, the lighting source is one of a laser device and a light emitting diode (LED) device.

In some embodiments, the light beam generated through the plurality of lenses of the lens system is at least 60 mm wide when projected on a surface.

In some embodiments, the light beam is a collimated and coherent laser beam.

In some embodiments, the apparatus further comprises: forklift receiving members, and at least one support member mounted on the forklift receiving members, the at least one support member for supporting the frame base.

In some embodiments, the orientable support further comprises a support housing operatively connected to a support arm, the tower head is mounted on the support arm, and the support housing comprises: a first servo motor operatively connected to a first gear system for rotating the support arm about the vertical axis, the first servo motor being operatively connected to the at least one power supply, and a second servo motor operatively connected to a second gear system for rotating the support arm about the longitudinal axis, the second servo motor being operatively connected to the at least one power supply.

In some embodiments the at least one power supply comprises: a processor power supply, a lighting controller power supply, and a lighting source power supply.

In some embodiments the housing further comprises: a heating element, and a temperature controller connected to the heating element.

In some embodiments, the housing further comprises: a fan connected to the temperature controller.

In some embodiments, the apparatus further comprises a safety button connected to the processor, and activation of the safety button causes the processor to interrupt current to the lighting source.

In some embodiments, activation of the safety button further causes the processor to interrupt current to the orientable support.

In some embodiments, the housing is sealed against water and dust.

According to a second broad aspect of the present technology, there is provided a method of controlling an automatically orientable light source to generate a light beam for deterring pest, the automatically orientable light source being controlled by a processor, the processor being connected to a memory, the method comprising: determining, by the processor, a current time, comparing, by the processor, the current time to a sunrise time and a sunset time, in response to the current time being between the sunrise time and the sunset time: activating, by the processor, the automatically orientable light source to generate the light beam, and in response to the current time being between the sunset time and the sunrise time: interrupting, by the processor, the automatically orientable light source.

In some embodiments, the current time is determined according to a pre-set regional time zone.

According to a third broad aspect of the present technology, there is provided a method for deterring pest using a light beam generated by a lighting source mounted on an orientable support, the orientable support being controllable by a processor, the processor being connected to a memory, the orientable support being configured to rotate about a vertical axis and a longitudinal axis, the method executable by the processor, the method comprising: acquiring, by the processor from the memory, a first predetermined point on the vertical axis defining a first limit of a field, a second predetermined point on the vertical axis defining a second limit of the field, a first predetermined point on the horizontal axis defining a third limit of the field, and a second predetermined point on the horizontal axis defining a fourth limit of the field, acquiring, by the processor, an origin position of the light beam, controlling, by the processor, the orientable support to move from the origin position to one of the first predetermined point, the second predetermined point, the third predetermined point and the fourth predetermined point, controlling, by the processor, the orientable support to move linearly to every other one of the first predetermined point, the second predetermined point, the third predetermined point and the fourth predetermined point such that an entirety of the field is covered.

In some embodiments, the method further comprises: acquiring, by the processor, a plurality of predetermined random points, determining, by the processor, a starting point in the plurality of predetermined random points, determining, by the processor, an end point in the plurality of predetermined random points, controlling, by the processor, the orientable support to move linearly from the starting point to the end point such that an entirety of the plurality of predetermined points is covered.

In some embodiments, the method further comprises, after determining the end point in the plurality of points: determining, by the processor, a reference point, and the controlling the orientable support to move linearly from the starting point to the end point in the plurality of predetermined random points is made such that: the orientable support moves alternately from a most distant random predetermined point in the plurality of predetermined random points to a least distance random point.

BRIEF DESCRIPTION OF THE DRAWINGS

The above and other aspects, features and advantages of the invention will become more readily apparent from the following description, reference being made to the accompanying drawings in which.

DETAILED DESCRIPTION

Figure 1:
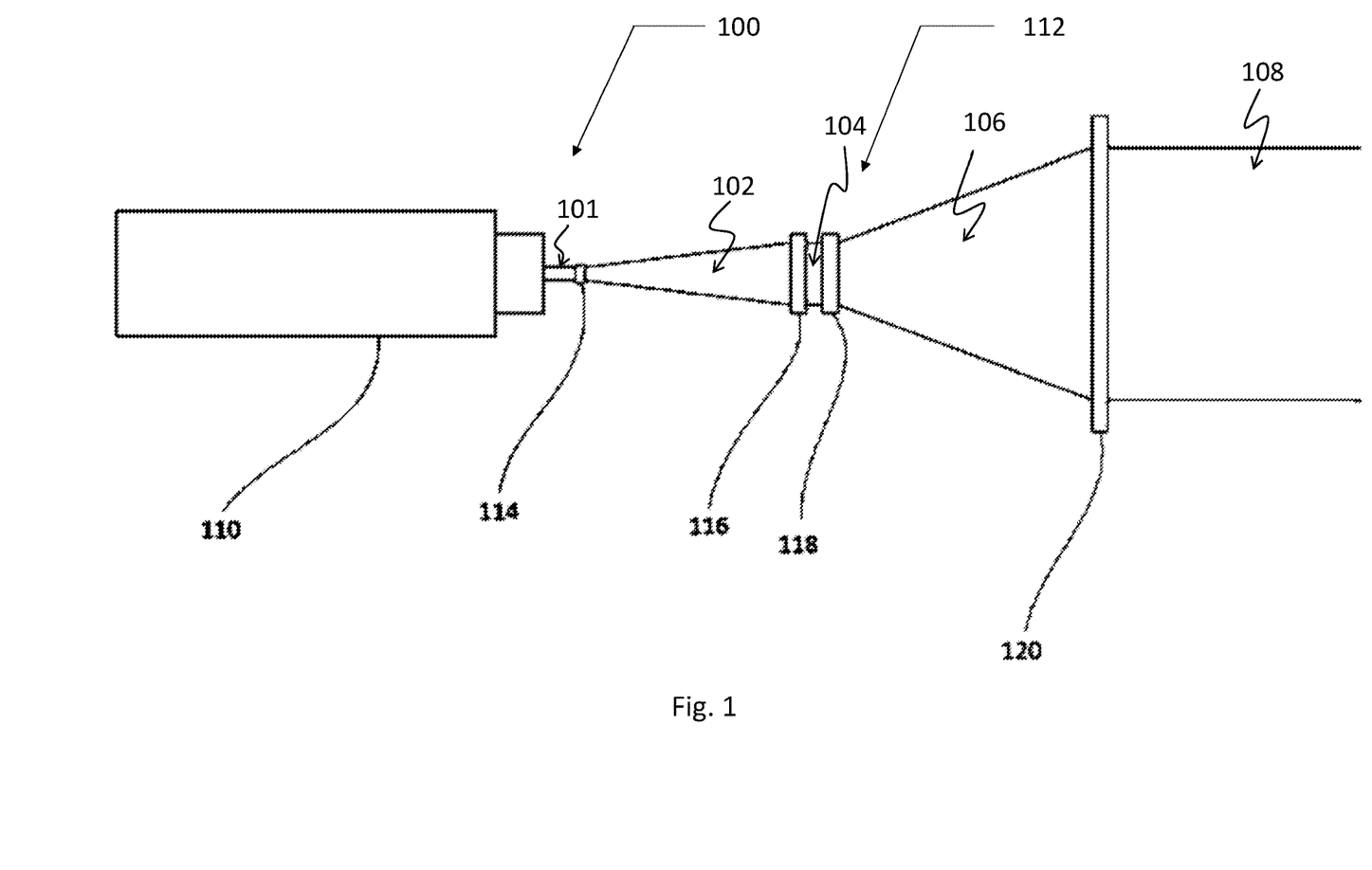
FIG. 1 presents a laser system having a laser device and a magnifying system, the magnifying system having optical lenses, according to one embodiment.

FIG. 1 presents a laser system 100 having a laser device 110 and a magnifying system 112 according to one embodiment. The laser device 110 is a DPSS laser and the magnifying system 112 has a plurality of lens adapted to produce an output laser beam 108 that is safe but is yet adapted to deter birds. The DPSS laser 110 and the lens system 112 are aligned such that the laser beam produced by the DPSS laser 110 is oriented to pass through the lens system. The laser beam or input laser beam 101 originates from the DPSS laser 110 with a diameter between 1.5 mm and 2.5 mm. The lens system is adapted to expand the input laser beam 101 to at least an output laser beam 108 of 60 mm in diameter at the output of the lens system. The input laser beam passes through four lenses: a first concave diverging lens 114, a second convex converging lens 116 and a third concave diverging lens 118 and finally a fourth convex converging lens 120. As can be noticed in FIG. 1, the first lens 114 is adapted to increase the diameter of the input laser beam to produce a first intermediate beam 102. The second lens 116 is adapted to converge the first intermediate beam 102 to produce a second intermediate beam 104, since the focal point of the first lens 114 and the focal point of the second lens 116 are aligned the second intermediate laser beam 104 has a rather parallel shape with a diameter between 15 to 25 mm. This second intermediate laser beam 104 passes through a third lens 118 that has a larger diameter than the beam. This third lens 118 is a concave and a diverging lens adapted to increase the diameter of the beam 104 to produce a third intermediate beam 106. Afterwards, the laser beam reaches the last lens of the optical system 112, which is a converging lens 120. The last two lenses (118 and 120) may create any suitable multiplication effect. In this embodiment the last two lenses create a multiplication effect of four and produce the output laser beam 108 having a diameter between 60 to 100 mm. As the focal points of the last two lenses (118 and 120) are aligned, the output laser beam 108 has a parallel shape or at least close to a parallel shape. In this embodiment a distance between the first lens 114 and the last lens 120 measures about 50 cm.

The DPSS laser 110 is a standard DPSS laser supplied by a laser manufacturer. The lenses of the lens system 112 may be supplied by an optical manufacturer or by optical magnifier systems that may be provided by a manufacturer. It shall be understood that the lens system 112 could be replaced by any other suitable lens system having lenses adapted to produce a safe laser beam of at least 60 mm. It shall also be understood the DPSS laser 110 may be replaced by any other suitable system adapted to generate a suitable laser beam or any other suitable light source such as an LED (light emitting diode) source. Indeed, the LED may also provide sufficient light power with a specific lens to collimate light or with a reflector system to generate a beam that will be larger than 25 mm diameter and potentially deter birds or other pests.

Figure 2:
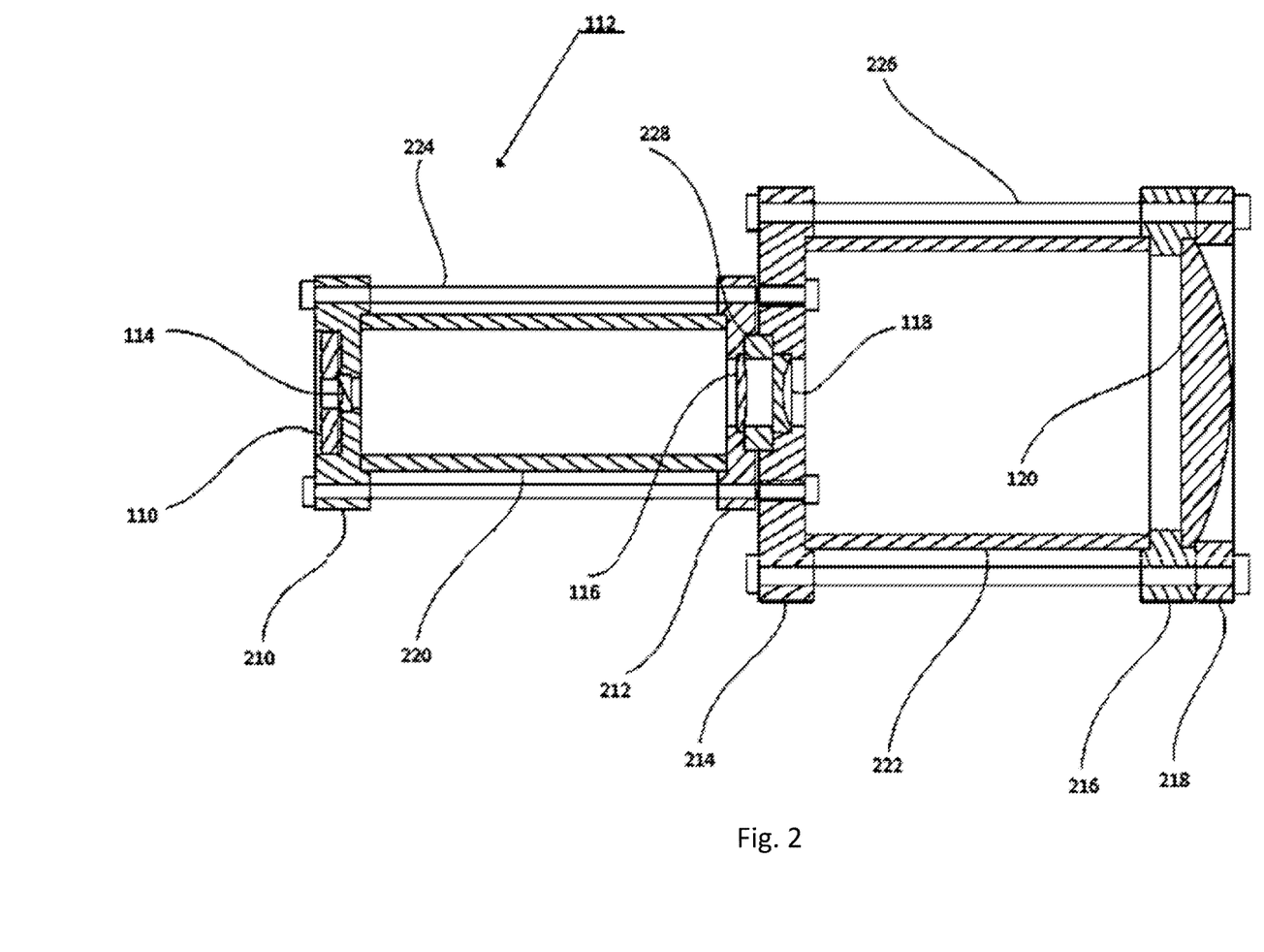
FIG. 2 presents a sectional view of the magnifying system of FIG. 1, according to one embodiment.

FIG. 2 presents a sectional view of the magnifying system 112, according to one embodiment. The lens of the magnifying system 112 are positioned and oriented to accurately and coaxially maintain in position. The first lens 114 is held in place by a lens holder 210 that is adapted to fixedly maintain the lens, in cooperation with the laser body 110. The lens holder 210 has an opening in which the first lens 114 may be placed in order to fixedly maintain the lens in an accurate or suitable position. The second lens 116 is maintained between a lens holder 212 and a pressure ring 228 that is placed between the second lens 116 and the third lens 118. The second lens holder 212 may have an opening that is large enough to place the second lens 116 therein in order to fixedly and accurately maintain the second lens 116 in position. The third lens 118 is maintained between the pressure ring 228 and the third lens holder 214. The third lens holder 214 has an opening that is large enough to place the third lens 118 therein in order to fixedly and accurately maintain the third lens 118 in position. The fourth lens 120 is maintained between the lens holder 216 and the outer ring 218. The fourth lens holder 216 has an opening that is large enough to place the second lens therein in order to fixedly and accurately maintain the fourth lens 120 in position. A first tube 220 is placed between the first lens holder 210 and the second lens holder 212 and assures that a required distance between the two holders (210 and 212) is respected in order to obtain required optical results. A second tube 222 is placed between the third lens holder 214 and the fourth lens holder 216 and assures that a required distance between the two holders (214 and 216) is respected in order to obtain required optical results. The first two lens holders (210 and 212) and the tube 220 are held in place by a screw system 224 that extends through the first lens holder 210, the second lens holder 212 and the third lens holder 214 in order to fixedly maintain and attach all these elements (210, 212, 214 and 220) in place. The third and fourth lens holders (214 and 216), and the outer ring 218 as well as the tube 222 are held in place by a screw system 226 that extends through the third lens holder, the fourth lens holder and the outer ring 218 in order to fixedly maintain and attach all these elements (214, 216, 218 and 222) in place. It is understood that the holding system may be different and work with screw systems and holder that would be screwed through the tube for example. These variations may serve the same purpose and shall be considered as valid alternatives to this solution.

Figure 3:
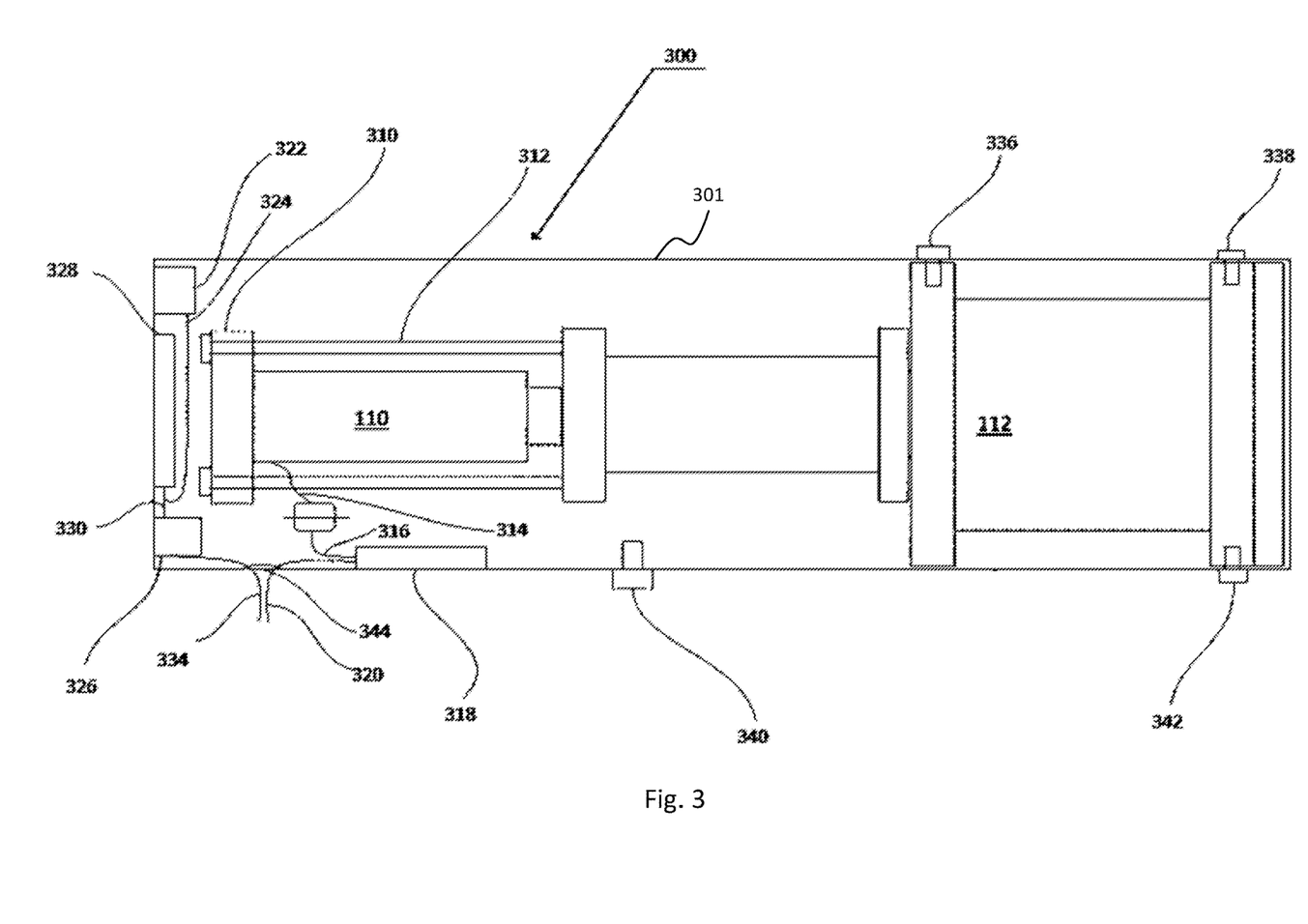
FIG. 3 presents a housing having therein the laser system of FIG. 1, according to one embodiment.

FIG. 3 presents a tower head 300 having housing 301 and positioned within the housing is the laser device 110 and lens system 112. In addition, the tower head 300 has various electronics components. The laser 110 is fixedly positioned between a back holder 310 and the magnifying system 112. The back holder 310 may have an opening at its center in order to let air potentially circulate and help the DPSS laser 110 cool down. The back holder 310 and the magnifying system 112 is attached to screws 312 passing through both systems, and fixedly maintains the laser 110 between the holder 310 and the magnifying system 112.

Laser Controller

According to one embodiment, the laser device 110 is connected to a laser controller such as a control card 318 with a laser head connector 314 connected to the laser device 110 and another laser head connector 316 connected to the control card 318. According to one embodiment, the laser controller 318 adjusts an output power to be delivered to the laser in order to either manage the quantity of light emitted or the heat produced by the laser device. The laser controller 318 may also be adapted to control the energy provided to the laser device 110 in order to operate and to activate a cooling fan of the laser. The control card 318 is powered by a power supply wire 320 that is connected to a dedicated power supply 614 through a relay 618 and a wire 620 positioned in the electronics portion of the laser tower 520 and described in FIG. 6.

Housing Temperature Controller

According to one embodiment, a heater 322 is positioned in the housing 301 in order to increase a temperature therein when needed. This heater 322 is mounted directly onto an inner wall of the housing 301 with an attachment such as screws. The heater 322 is connected with an electrical wire 324 to a temperature controller or temperature control card 326. The temperature controller 326 is adapted to control the temperature of the housing and deliver energy to the heater 322 accordingly. According to one embodiment, the temperature controller 326 is connected to a fan 328 with an electrical wire 330. The fan 328 is adapted to cool the air within the housing 301 and reduce the temperature of the housing by ventilating the air therein.

According to one embodiment, the temperature controller 326 is mounted to an inner wall of the housing 301 with an attachment such as screws. The temperature controller 326 has power supply wire 334 that may supply 24V. DC current.

According to one embodiment, the magnifying system 112 is mounted on an inner wall of the housing with an attachment such as screws 336 and 338 that are respectively inserted with the third and fourth lens holders (214 and 216).

As further presented in FIG. 3 and concurrently presented in FIG. 4, according to one embodiment, the housing 301 is mounted on a robotic arm or orientable support 400 with an attachment as screws (340 and 342). The housing 301 defines openings 344 through which various wires may pass and be connected. It shall be understood that the laser device 110 may be mounted and aligned by any other suitable mounting mechanism within the housing 301. It shall be recognized that the various components within the housing 301 may be positioned differently and be connected through other suitable systems and wires to operate. It shall further be recognized that there are various other ways to suitably secure the various components in the housing such as a permanent attachment in the case of a bonding agent of a weld or such as a removable attachment in the case of a clip system, or a pressure mounted system. Moreover, additional components could be added to the tower head 300 such as a vent cap that may allow further ventilation within the housing, or other attachments to further secure or operate the lens system 112 and laser device 110 for instance.

Figure 4A:
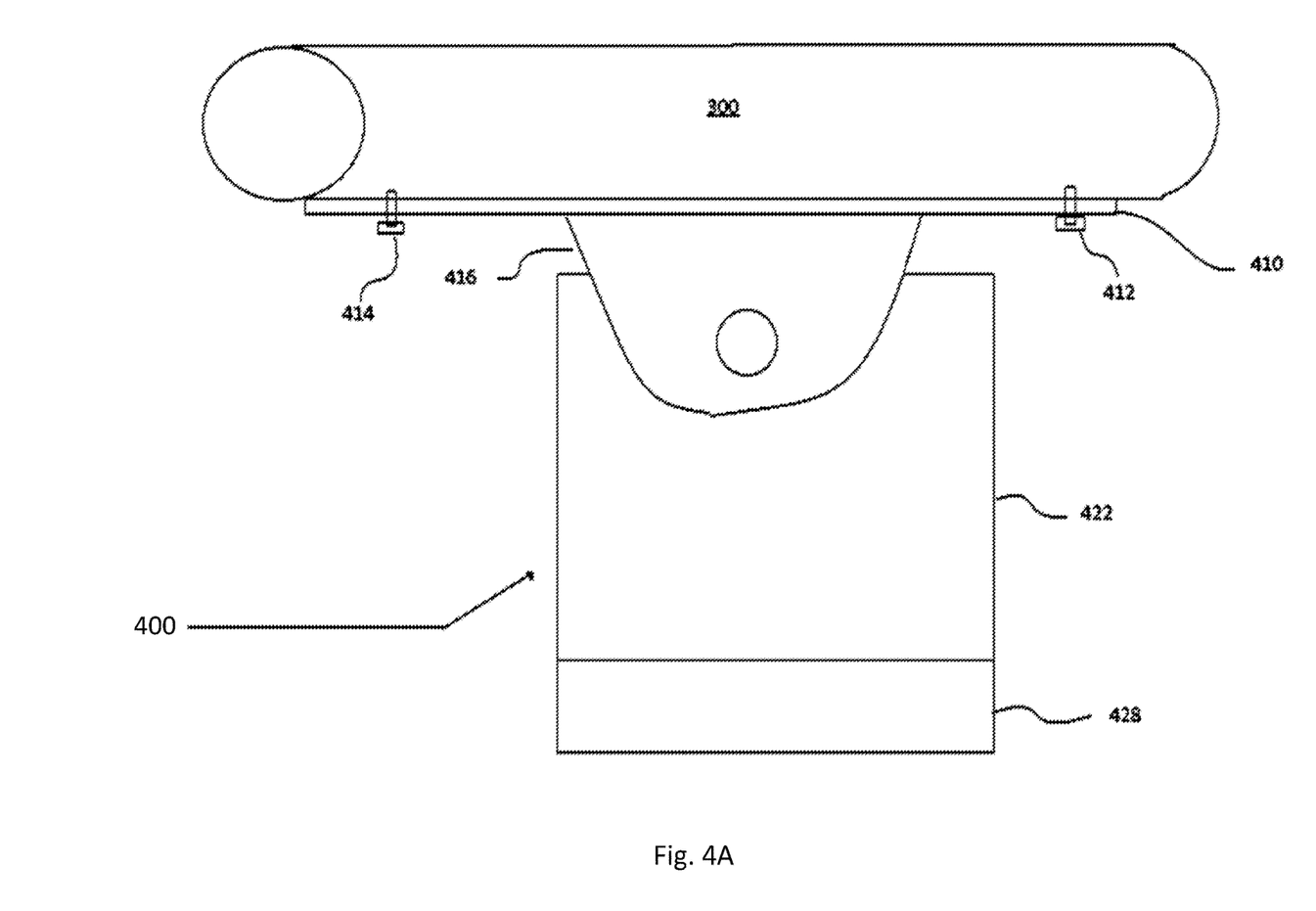
FIG. 4A presents a side view of an orientable support supporting the laser system, according to one embodiment.

FIG. 4A presents a side view of the robotic arm or orientable support 400 connected to servo motors (not shown), according to one embodiment. The orientable support 400 has a plate 410 adapted to support the tower head 300. The tower head 300 is mounted to the plate 410 with attachments such as screws 412 and 414. The plate 410 is mounted to the orientable support 400 with a weld.

Figure 4B:
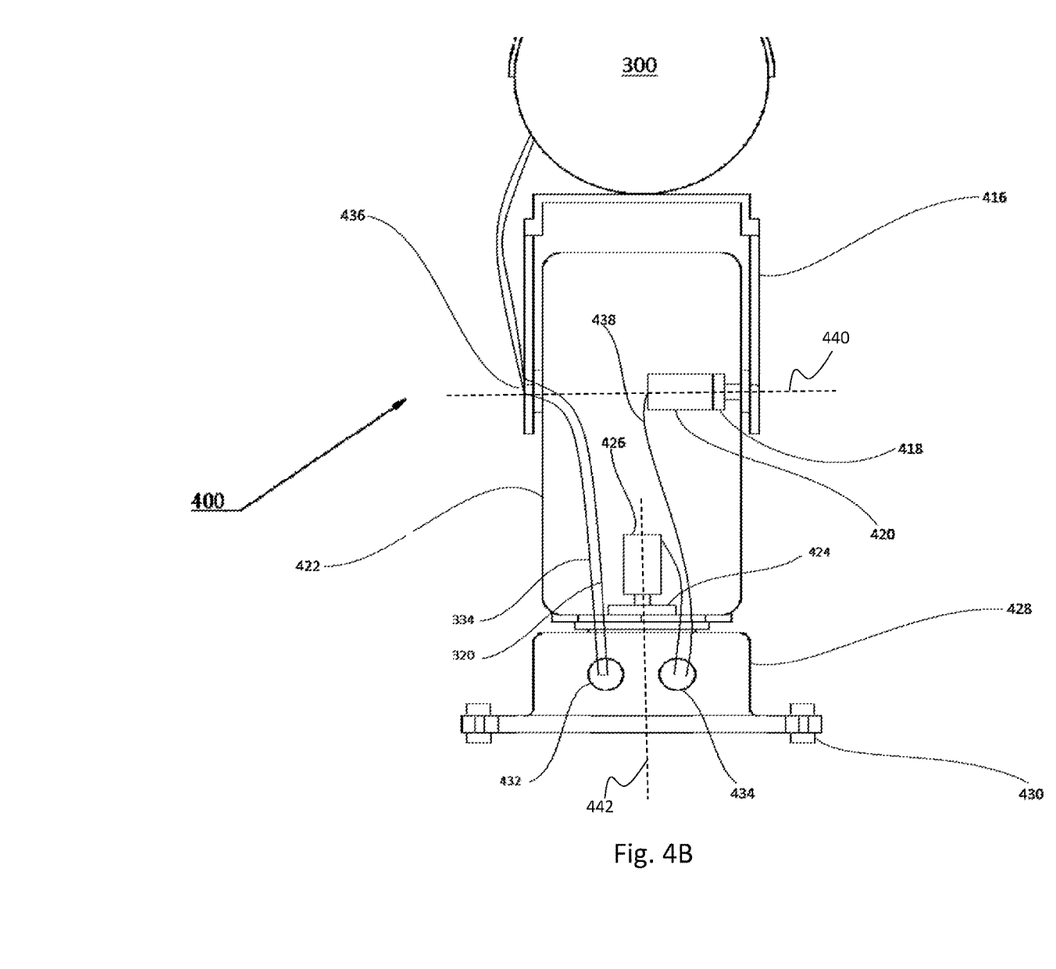
FIG. 4B presents a front view of the support of FIG. 4A having housed therein two controllable servo motors and associated gear systems, according to one embodiment.

FIG. 4B presents a front view of the orientable support 400 has a support arm 416. According to one embodiment, the support arm 416 is adapted to connect to a first gear system 418 which is connected to a first servo motor 420. The support arm 416 is adapted to rotate around a transversal axis 440 from an angle of minus 80° up to plus 90°. The servo motor 420 provides such rotational movements in cooperation with the gear system 418 in order to increase its torque and ability to move the tower head 300 weighting four kilos or more. The gear system 418 placed between the orientable support 400 and the servo motor 420 provides a movement to the orientable support 400 according to a the vertical axis.

According to one embodiment, the orientable support 400 has a support housing 422. The support housing 422 has a second gear system 424 that is connected to a second servo motor 426 and in cooperation are adapted to generate and control a rotation movement of the orientable support 416 around longitudinal axis 442.

According to one embodiment, the support housing 422 is mounted on an attachment frame 428. The attachment frame 428 has openings 432 and 434 to provide a cable or wire passage in order to allow cables and wires of the support housing 422 such as control cables of the servo motors 420 and 426, represented by 438 wire and power supply wires 320 and 334 to pass therethrough. The attachment frame 428 provides a wire and cable interference free mounting of the orientable support 400 to a base frame 500, as concurrently presented in FIG. 5. The orientable support 400 is mounted on the base frame 500 with any suitable attachment such as screws 430.

It shall be understood that the shape, form and size of the orientable support 400 can differ from one design to another while still having a same purpose which is to controllably direct or move the tower head 300 in order to provide a controlled laser beam according to a desired pattern. It is understood that servo motors may have different wiring and may still serve a similar purpose. It is understood that servo motors may operate 360° each and that their limitations depend on the final design of the orientable support 400, and therefore it may increase or decrease according to the design chosen for production, however it serves the same purpose whatever the conditions of operations or the extent of the operations ability. It shall be recognized that a tilt pan could replace the orientable support 400, and would function similarly. It is understood that servo motors could be replaced by stepped motors to operate the orientable support 400 or the tilt pan. It is understood that the hole through which the wires are passing through could be organized differently. Moreover, in some embodiments, it may be desirable to have a support housing 422 that is adequately sealed to prevent any harmful amount of dust or water to enter therein and protect the servo motors 420 and 426 or gear systems 418 and 424. It is also understood that all the wires that are exposed out of the tower may be reinforced to resist from various threats such as rats that could potentially disrupt the good way of working for the laser bird deterrent system.

It shall be recognized that another type of servo motors and another type of gear systems in any number that is suitably adapted to support and rotate in any desired fashion a tower head of any suitable type is possible without departing from the scope of the present system.

Figure 5:
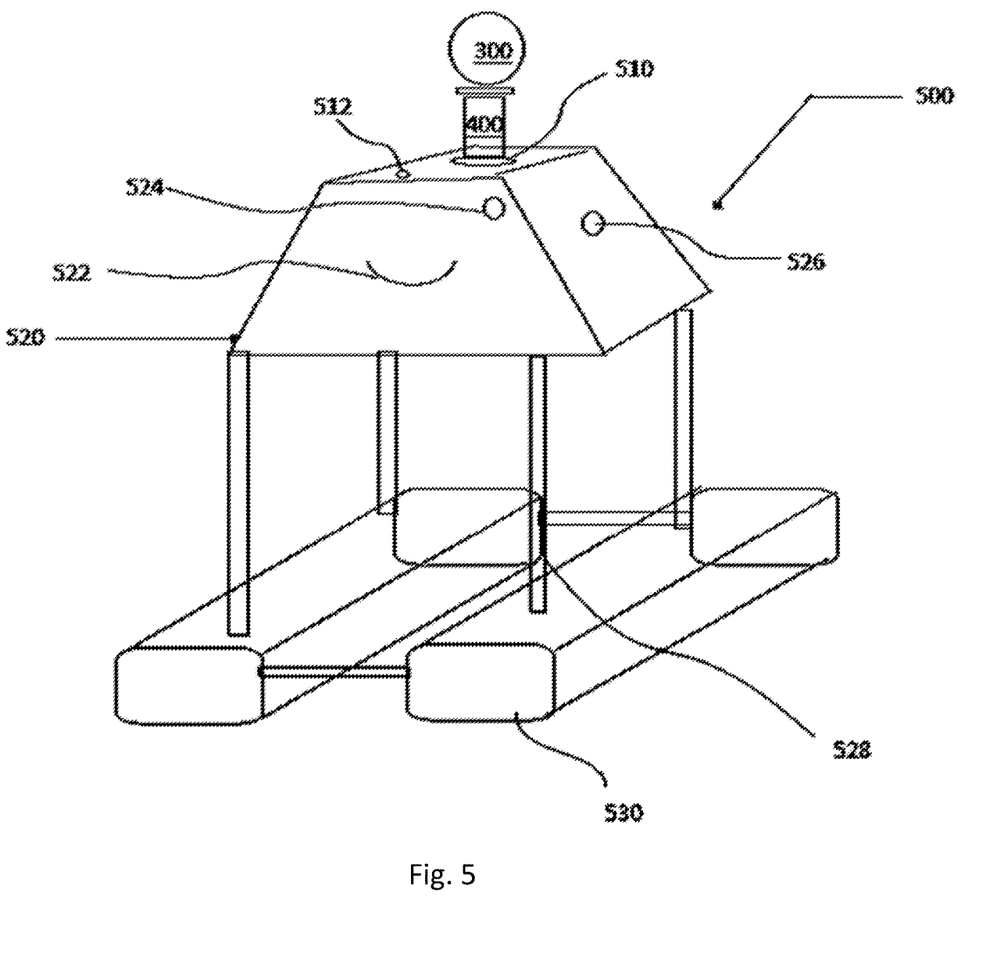
FIG. 5 presents a perspective view of a frame having mounted thereon the support and laser system of FIG. 4A, the frame having fork receiving members according to one embodiment.

FIG. 5 presents the orientable support 400 with the tower head 300 mounted thereon, the orientable support 400 is mounted on the frame base 500. The frame base 500 has four holes 510 that allows to screw and secure the orientable support 400 via the frame support 428, as concurrently presented in FIG. 4B. The frame base 500 has a wire and cable passage 512 that allows the wires and cables 326, 320, and 438 to pass there through and into the compartment 520. According to one embodiment, an interior portion (not shown) of the compartment is accessible from a hatch that has a handle 522 and that may be locked with lock 524. In order to maintain the interior portion sealed and potentially closed, the hatch may be locked with the lock 524 which may unlock with a key.

It is understood that the hatch may take various shapes and may even be optional, according to some embodiments. It may also be locked through various systems such a fingerprint recognition, or voice recognition systems in order to ensure the safety of the sealed compartment.

According to one embodiment, the compartment 520 has a safety stop button 526. The button may be passed through a hole to show only its practical element. The stop button 526 may be pushed at any time to stop the laser deterrence system to operate. It may stop operating as long as the stop button may be armed.

According to one embodiment, the compartment 520 is a sealed compartment and prevents any undesirable dust or water to enter therein.

According to one embodiment, the compartment 520 has four elevation members 528 mounted on fork receiving members 530. The elevation members 528 are sized to provide a suitable elevation to the tower head 300. The fork receiving member 530 are adapted to receive a corresponding fork from a forklift and are shaped and sized accordingly. The fork receiving members 530 must be wide enough so that forklift pads may go through it and may be able to elevate the bird deterrence system to place it elsewhere, at any desired location of the site.

It is understood that there are other various ways to make such a basis tower 500 easy to move around, fork holes is the preferred method, however other ways could be adapting directly wheels at the bottom of the tower, or mounting the tower on a similar system such as a trailer, or choosing a lighter design so that it may be transported manually.

Figure 6:
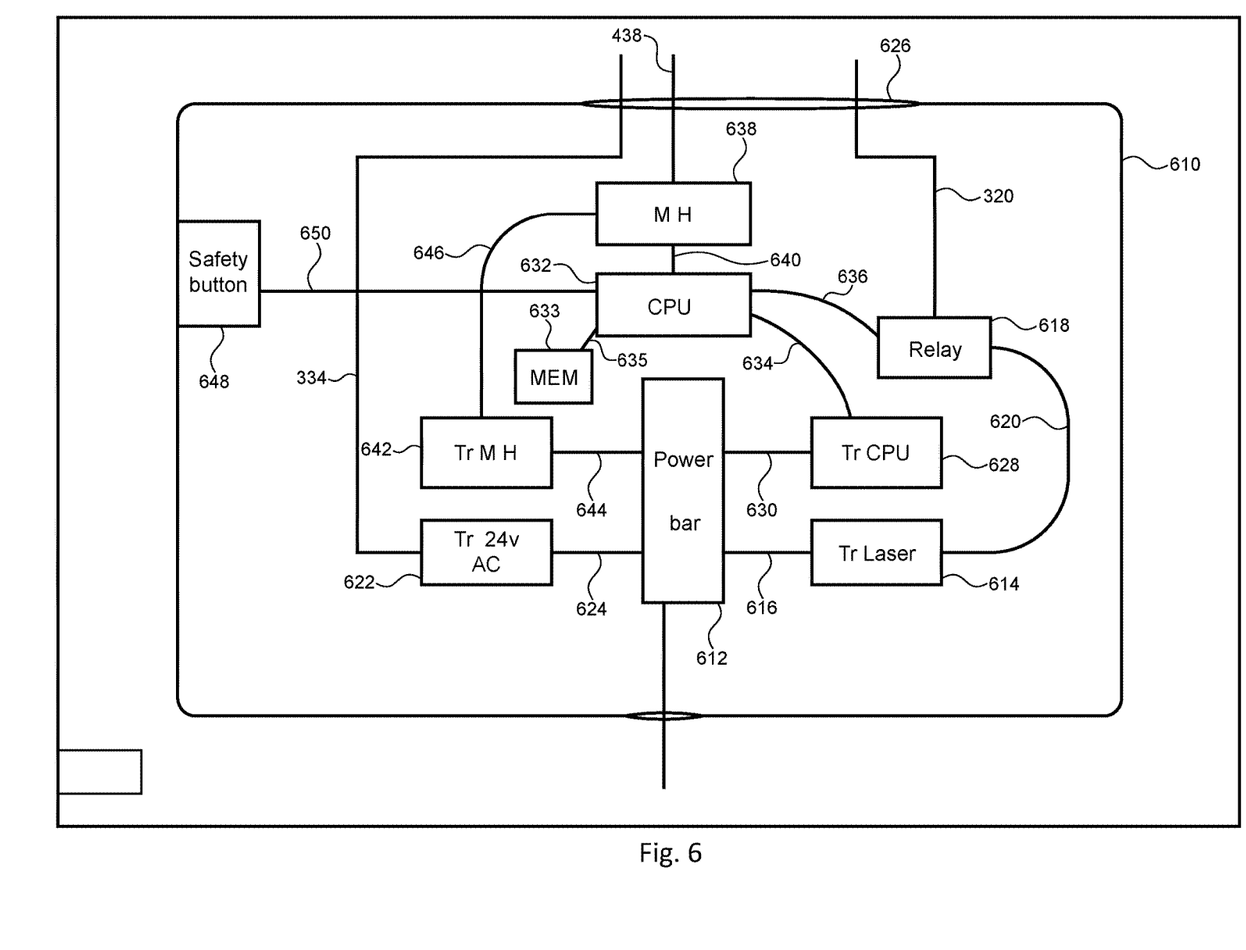
FIG. 6 presents an inner view of a container of the frame where the electronic components are sealed therein, according to one embodiment.

FIG. 6 presents the various components that are positioned within the compartment 520, according to one embodiment. Within the compartment 520 there is a plate 610 adapted to prevent electrical arcs and short circuits. This plate may be secured with a bonding agent to an inner wall of the compartment. At the center of this plate 610 there is a power bar 612 with its power cable that may pass through the structure to reach outside and may be plugged into a 110V. plug or 220V. according to the standard power supply of the region. This power bar 612 may be fixed with glue onto the plastic plate 610. This power bar may be connected to the laser power supply 614 through an electrical wire 616. This laser power supply 614 may then provide power to a relay 618 through another electrical wire 620. The power bar 612 may also provide power to the 24V AC power supply 622 through a wire 624. This 24V AC power supply may then let power pass through the wire 334 to potentially supply power to the control card 326. The wire 334 passes through a hole 626 out of the compartment to reach the orientable support 400. The power bar 612 may supply power to the power supply of the CPU 628 through an electrical wire 630. This power supply may supply power to the CPU 632 thanks to an electrical wire 634. The CPU 632 may contain the intelligence, code, decision making processes and stored data of the system. A potential method through the code within the CPU is described in the following paragraphs. The CPU 632 may be connected to a relay 618 through a wire 636. It may pass information to close or open the relay, in order to let power pass through the wire that is connected to the control board of the laser 318 through the wire 320. The wire 320 is therefore potentially connected to the relay 618 and may pass through the hole 626 to potentially pass through the orientable support 400 to then reach the control board 318. The CPU 632 may also be attached to the mother hat 638, the mother hat transforms information of the CPU 632 into electrical impulses that may drive the servo motors 426 & 420 that may orientate the bird deterrence beam. This information may pass through wires 438 that may pass through a hole 626 out of the compartment. The CPU is attached to the mother hat through a wire 640. The power bar 612 is attached to the mother hat power supply 642 through a wire 644. It may therefore provide power for the mother hat power supply to provide it directly to the mother hat 638 through a wire 646. The safety button 648 may ensure that the laser potentially stops when it is pressed, and that the tower may stop moving as well. This safety button is attached to the CPU 632 through a wire 650 that will transmit the information to the CPU 632. When the stop button 648 is pressed, the CPU 632 may open the relay 618 to prevent the power to reach the laser, and it may stop sending signals to the Mother Hat 638. It is understood that the configuration of the whole electrical and electronical apparatus may vary according to electrical and electronical specifications of the chosen parts, however it may serve the same purpose for making the apparatus working. It is assumed that the CPU may be designed specifically for this application or that it may rely on a standard CPU such as Raspberry Pi for example. It is understood that the various parts described are purchased directly from industrial suppliers that manufacture those specific parts such as relay, power supplies, power bar, safety button, wires, or mother hat.

The CPU 632 may contain the intelligence that may guide the tower to deter birds. According to one embodiment, the logical pattern that may allow the deterrence system to be effective includes any one of or combination of a method of activating a light 700, a method of moving a tower head 800 as presented in FIGS. 7 and 8.

Figure 7:
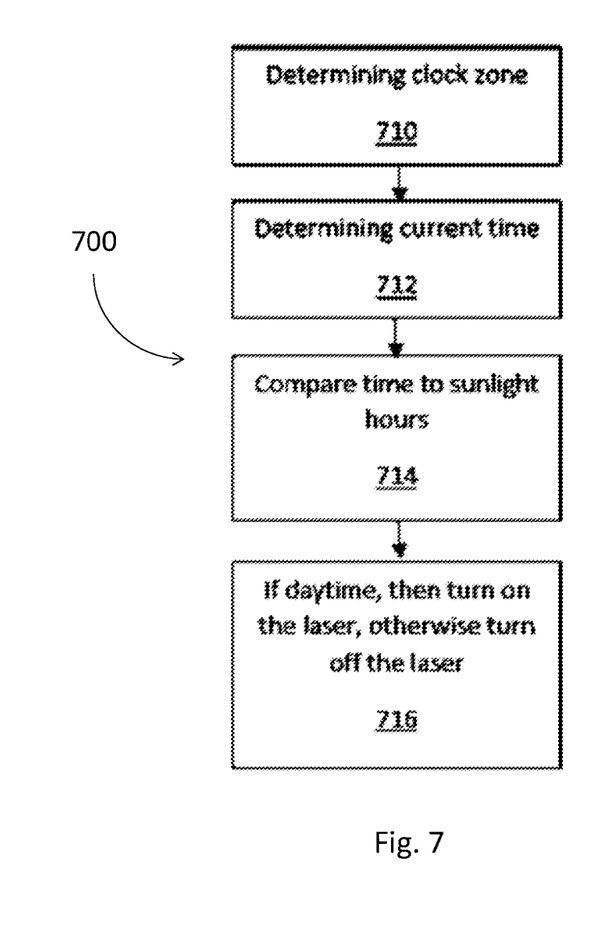
FIG. 7 is a block diagram presenting a method of automatically activating the laser system according to a set of predetermined conditions defined in a memory that is executable by a processor, according to one embodiment.

Presented in FIG. 7 is the method of activating a light 700 according to one embodiment, to determine when to turn on the laser by closing the relay with the CPU, a continuous check of the status of the tower is set to decide whether the laser shall be lit on. A current time is determined 712 according to a regional time zone 712. The current time is determined according to a preset time zone. The current time is then compared to a sunrise time and sunset time 714. If the current time is later than sunrise, and sooner than sunset, then the laser is turned on, otherwise the laser is turned off 716. It is understood that anytime the safety button is armed the laser will be turned off.

Figure 8:
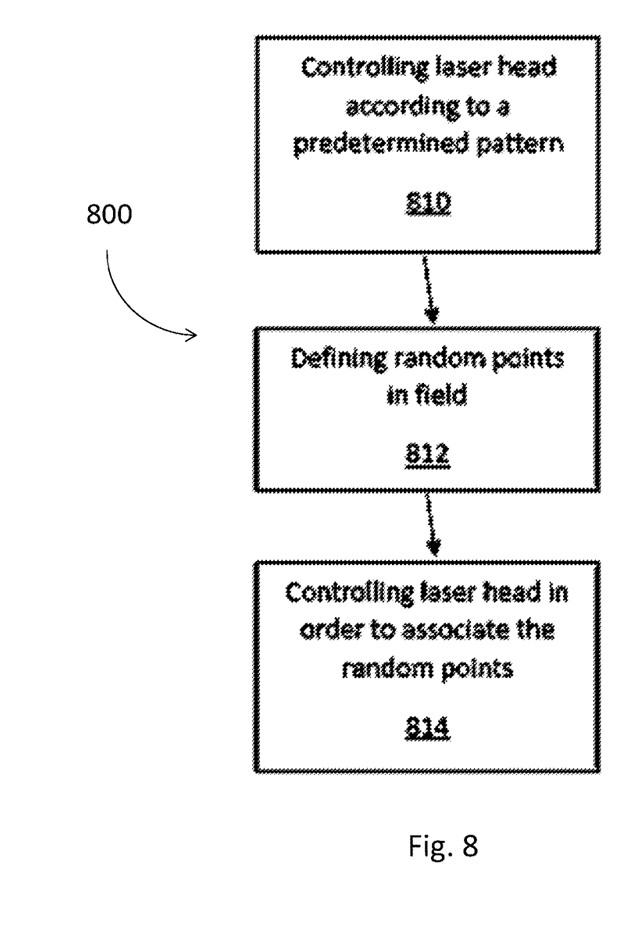
FIG. 8 is a block diagram presenting a method for controlling an orientation of the support and pan and tilt movement of the laser, according to one embodiment.

Presented in FIG. 8 is the method of moving a tower head 800 in order to determine where and how the laser beam shall be projected and to control the servo motors accordingly. According to one embodiment, four points are predetermined and set in memory 633 These four points are the outer limits defining a field within which the beam may be projected. The CPU is adapted to receive the outer limits or field information. The CPU is also adapted to receive a predetermined origin position the laser beam The CPU is adapted to determine the various positions at which the laser beam may be allowed to project and operate within, according to the field information and the origin position. The way the servo motors may displace the beam within the field may follow various patterns.

According to one embodiment, the tower head is controlled according to two different patterns. The laser head or tower head 300 is controlled according to a predetermined pattern 810 such as linear pattern, as concurrently presented in FIG. 9A or such as random point association pattern, as concurrently presented in FIG. 9C. Then random points in the field limits are defined 812 as concurrently presented by random point pattern of FIG. 9B. The laser head 300 is then controlled according to the random points 814, as presented by random point association pattern of FIG. 9C.

Figure 9A:
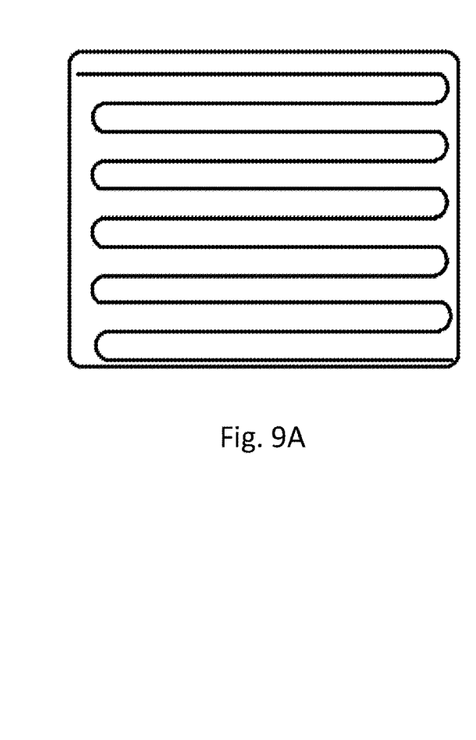
FIG. 9a illustrates one pattern produced by the method for controlling of FIG. 8, according to one embodiment.

According to one embodiment, the linear pattern of FIG. 9A may be achieved by controlling the tower head 300 to start at a highest point on the vertical axis (most remote point of the field) and by scanning horizontally from left to right. Once the field limit is reached the tower head 300 is controlled to shift by a predetermined angle toward a lowest point on the vertical axis (closest point of the field) and resume scanning from the last horizontal side toward the other (i.e. left to right or right to left). This procedure may repeat multiple times until the beam reaches the opposite point that may be the lowest right point within the field limit.

Figure 9B:
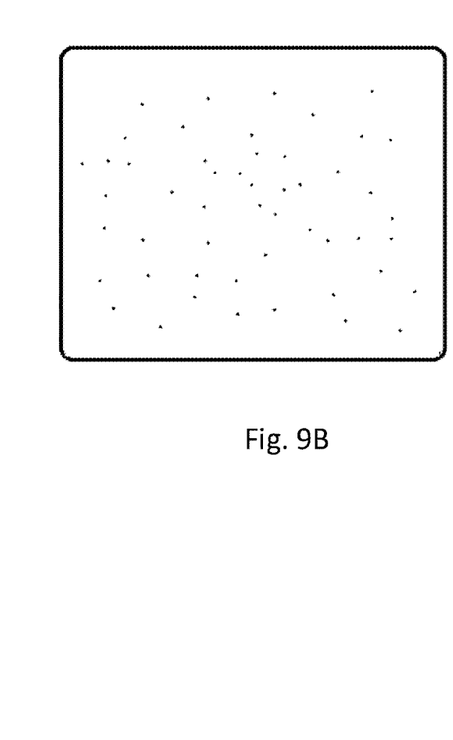
FIG. 9b illustrates an alternate pattern produced by the method for controlling of FIG. 8, according to one embodiment.
Figure 9C:
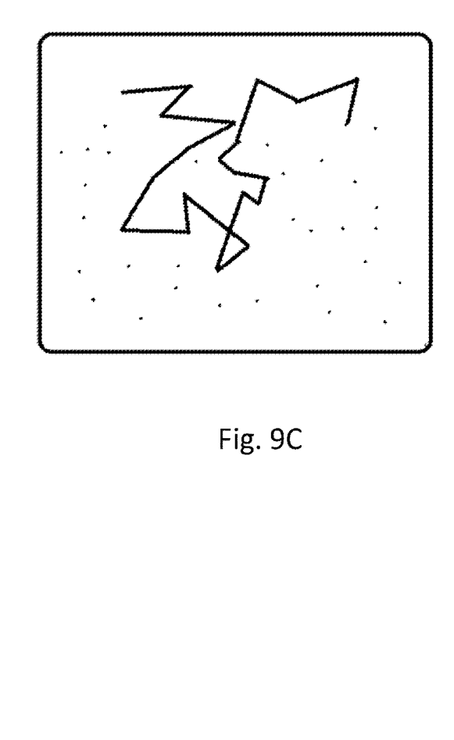
FIG. 9c illustrates an alternate pattern produced by the method for controlling of FIG. 8, according to one embodiment.

According to one embodiment, the random point association pattern of FIG. 9C may be achieved by determining various random points within the field limits 812, as is illustrated in FIG. 9B; and by controlling 814 the tower head 300 to associate the random points of the pattern in FIG. 9B by moving the tower head 300 from one random point to another and reach all the random points, as illustrated in FIG. 9C. The tower head 300 can be controlled to associate the random points according to any suitable predetermined rule. According to one embodiment, the rule may indicate to associate the random points from sequentially from a most distant random point to a least distant random point with respect to a given reference point. According to another embodiment, the rule may indicate to associate the random points by alternating between a most distant random point to a least distant random point with respect to a given reference point. According to yet another embodiment, the rule may indicate to randomly associate the random points. Once all the random points are reached, the determining random points 812 and the controlling the tower head 814 may be repeated multiple times. The tower head 300 may however be controlled according to another association rule using the previously determined random points. The tower head 300 may also be controlled according to another group of determined random points and a same or another association rule.

It shall be understood that the tower head may be controlled successively according to a predetermined pattern 810 and according to random points 812.

It shall also be understood that the tower head may be controlled according to a pattern to strategically displace a pest or bird away from the field limits be it in a linear pattern such as the linear pattern of FIG. 9A or any other suitable pattern.

When the safety button 648 is pressed, it may be considered as activated. While the button is activated, it may trigger within the CPU 632 the order to close the relay to prevent the current from circulating through it to power the laser 110, and therefore potentially shut down the laser 110 as long as the safety button is activated. In parallel, the safety button shall trigger within the CPU an order that may be passed to the mother hat 638 that no more current shall be provided to the servo motors and therefore shutting them down as long as the safety button is activated.

In order to communicate to the CPU 632 the various elements that may be necessary, there may be various ways to potentially transmit the information. It may be directly connected through a USB port to a computer, it may be connected through WIFI, Satellite signals, Bluetooth or RFID or any other communication mean to a computer or a smartphone or a specific command system or device to communicate information or any other element potentially either directly or indirectly, or via an interface such as a web page, an application, or a specific software.

It is understood that there may be other elements that may be added to the apparatus and software logical pattern to improve the efficiency of the bird deterrent tower such a camera system to be able to detect birds, position them and project the laser beam into this direction. The detection system may be a camera, or a Lidar, infrared, ultrasound, or any other currently existing systems that may allow a bird detection. To operate the software side of the image processing and decision making from it, we may rely on various software, or specifically designed software that may help detect shapes, colors or movements or any other elements that may define a bird presence or that may help positioning the laser beam for an improved efficiency.

It shall be understood that although the above embodiment have been applied to deter birds, the laser system may also be adapted to deter other types of animals such as pests and insects.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. An apparatus for automatically deterring pest with a light beam comprising:
   a frame base having a compartment, the compartment comprising:
      at least one power supply;
      a processor connected to the at least one power supply; and
      a memory connected to the processor;
   an orientable support mounted on the frame base, the orientable support being configured to rotate about a vertical axis and a longitudinal axis, the orientable support comprising a support housing operatively connected to a support arm;
   a tower head mounted on the support arm, the tower head having a housing, the housing comprising:
      a lighting controller connected to the processor and to the at least one power supply;
      a lighting source connected to the lighting controller; and
      a lens system aligned with the lighting source, the lens system having a plurality of lenses;
   wherein:
      the lighting source is configured to generate the light beam through the plurality of lenses of the lens system;
      the processor is configured to:
         control the rotation of the orientable support about the vertical axis and the longitudinal axis via execution of instructions stored in the memory for orientating the light beam; and
      the support housing comprises:
         a first servo motor operatively connected to a first gear system for rotating the support arm about the vertical axis, the first servo motor being operatively connected to the at least one power supply; and
         a second servo motor operatively connected to a second gear system for rotating the support arm about the longitudinal axis, the second servo motor being operatively connected to the at least one power supply.

2. The apparatus of claim 1, wherein the light beam is orientated according to at least one of a predetermined pattern and a random point pattern.

3. The apparatus of claim 2, wherein the predetermined pattern is a linear pattern.

4. The apparatus of claim 1, wherein the lighting source is one of a laser device and a light emitting diode (LED) device.

5. The apparatus of claim 3, wherein the light beam generated through the plurality of lenses of the lens system is at least 60 mm wide when projected on a surface.

6. The apparatus of claim 4, wherein the light beam is a collimated and coherent laser beam.

7. The apparatus of claim 1, further comprising:
   forklift receiving members; and
   at least one support member mounted on the forklift receiving members, the at least one support member for supporting the frame base.

8. The apparatus of claim 1, wherein the at least one power supply comprises:
   a processor power supply;
   a lighting controller power supply; and
   a lighting source power supply.

9. The apparatus of claim 1, wherein the housing further comprises:
   a heating element; and
   a temperature controller connected to the heating element.

10. The apparatus of claim 9, wherein the housing further comprises:
a fan connected to the temperature controller.

11. The apparatus of claim 9, wherein activation of the safety button further causes the processor to interrupt current to the orientable support.

12. The apparatus of claim 1, further comprising:
a safety button connected to the processor; and
wherein activation of the safety button causes the processor to interrupt current to the lighting source.

13. The apparatus of claim 1, wherein the housing is sealed against water and dust.

14. A method for deterring pest using a light beam generated by a lighting source mounted on an orientable support, the orientable support being controllable by a processor, the processor being connected to a memory, the orientable support being configured to rotate about a vertical axis and a longitudinal axis, the method executable by the processor, the method comprising:
acquiring, by the processor from the memory,
   a first predetermined point on the vertical axis defining a first limit of a field,
   a second predetermined point on the vertical axis defining a second limit of the field,
   a first predetermined point on the horizontal axis defining a third limit of the field, and
   a second predetermined point on the horizontal axis defining a fourth limit of the field;
acquiring, by the processor, an origin position of the light beam;
controlling, by the processor, the orientable support to move from the origin position to one of the first predetermined point, the second predetermined point, the third predetermined point and the fourth predetermined point;
controlling, by the processor, the orientable support to move linearly to every other one of the first predetermined point, the second predetermined point, the third predetermined point and the fourth predetermined point such that an entirety of the field is covered;
acquiring, by the processor, a plurality of predetermined random points;
determining, by the processor, a starting point in the plurality of predetermined random points;
determining, by the processor, an end point in the plurality of predetermined random points; and
controlling, by the processor, the orientable support to move linearly from the starting point to the end point such that an entirety of the plurality of predetermined points is covered.

15. The method of claim 14, wherein:
the method further comprises, after determining the end point in the plurality of points:
determining, by the processor, a reference point; and
the controlling the orientable support to move linearly from the starting point to the end point in the plurality of predetermined random points is made such that:
the orientable support moves alternately from a most distant random predetermined point in the plurality of predetermined random points to a least distance random point.

\* \* \* \* \*